(12) United States Patent
Miller

(10) Patent No.: US 6,374,779 B1
(45) Date of Patent: Apr. 23, 2002

(54) LEASH AND COLLAR HAVING QUICK CONNECT/DISCONNECT CONNECTOR WITH DISCONNECT CONTROL IN HANDLE

(76) Inventor: Mark A. Miller, 10020 NE. 30$^{th}$ Pl., Bellevue, WA (US) 98004

( * ) Notice: Subject to any disclaimer, the term of this patent is extended or adjusted under 35 U.S.C. 154(b) by 0 days.

(21) Appl. No.: 09/357,517

(22) Filed: Jul. 19, 1999

Related U.S. Application Data

(63) Continuation-in-part of application No. 09/127,622, filed on Aug. 1, 1998, now abandoned.

(51) Int. Cl.$^7$ .................................................. A01K 3/00
(52) U.S. Cl. ......................................................... 119/863
(58) Field of Search ................................. 119/863, 865, 119/869, 856, 778, 792, 776, 779, 794, 772, 774

(56) References Cited

U.S. PATENT DOCUMENTS

| | | | | |
|---|---|---|---|---|
| 2,612,139 A | * | 9/1952 | Collins | 119/776 |
| 3,099,250 A | * | 7/1963 | Soles, Jr. | 119/776 |
| 3,422,502 A | * | 1/1969 | McCarthy | 119/776 |
| 3,540,089 A | * | 11/1970 | Franklin | 119/776 |
| 3,910,234 A | * | 10/1975 | Henson | 119/776 |
| 3,994,265 A | * | 11/1976 | Banks | 119/776 |
| 5,103,771 A | * | 4/1992 | Lee | 119/776 |
| 5,197,410 A | * | 3/1993 | Wilson et al. | 119/776 |

\* cited by examiner

*Primary Examiner*—Thomas Price

(57) ABSTRACT

The collar is disconnected from the leash by activating the mechanism in the handle assembly of the leash. The collar is fitted with a short cable which extends generally radially from the collar. A small cylinder or sphere is attached to the free end of this cable. There is a flared fitting at the end of the leash opposite to the handle end. The collar and leash are connected by trapping the cylinder or sphere in the flared fitting. The leash is a sheathed cable. The tension loads in the leash are carried by the cable. One end of the cable is anchored in the leash handle. There is a second cylinder or sphere attached to its other end and located in the flared fitting when the leash and collar are connected. The second cylinder or sphere retains the first in the flared fitting which is attached to the sheath. When the mechanism in the handle is activated, the mechanism moves the sheath along the cable so that the flared fitting is moved and no longer surrounds the cylinders (or spheres) and the one can no longer retain the other and disconnection is effected. In one embodiment of the invention the mechanism in the handle is reset by pulling the sheath out of the handle.

3 Claims, 2 Drawing Sheets

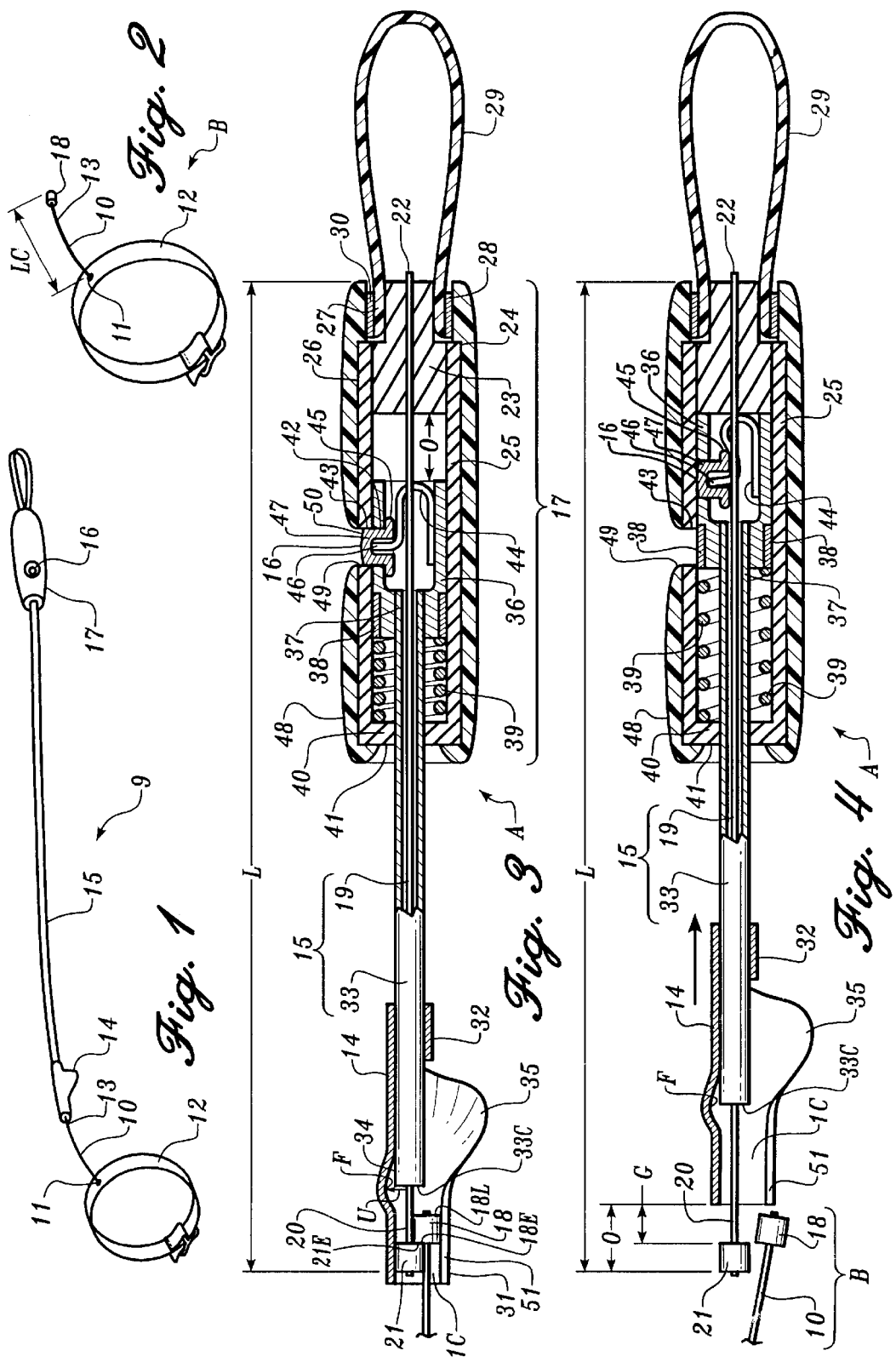

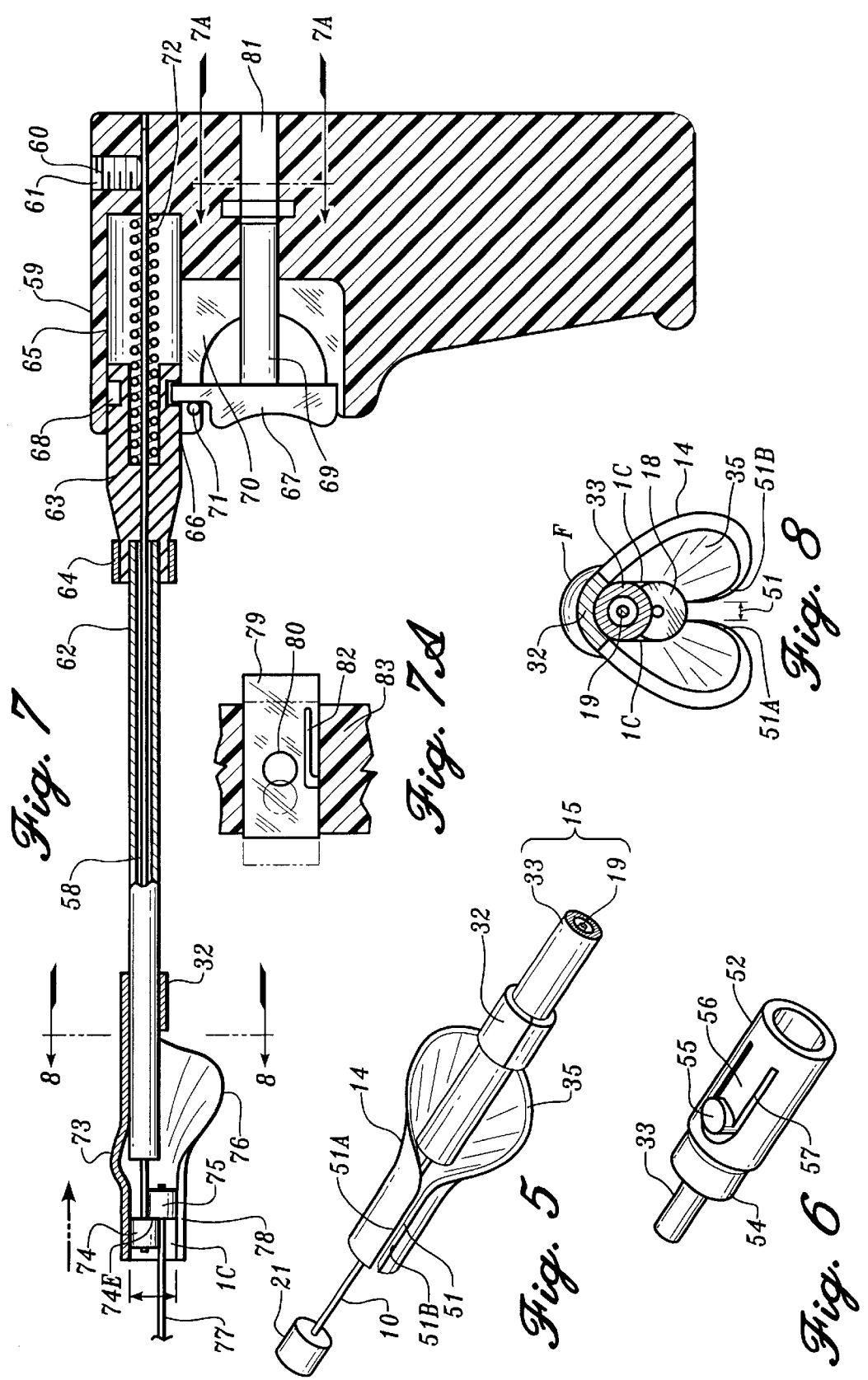

ated Aug. 1, 1998, now abandoned.

LEASH AND COLLAR HAVING QUICK CONNECT/DISCONNECT CONNECTOR WITH DISCONNECT CONTROL IN HANDLE

This application is a Continuation-In-Part application based on U.S. patent application Ser. No. 09/127,622, filed Aug. 1, 1998, now abandoned.

BACKGROUND OF THE INVENTION

1. Field

The subject invention is in the fields of animal leashes, leash/collar combinations and quick connect/disconnect connectors. In particular it is in the field of animal leash/collar combinations incorporating a quick connect/disconnect connector between the leash and collar and, more particularly, having the disconnect function of the connector controlled from the handle of the leash.

2. Prior Art

The patents listed below pertain to a dog leash having a load sensitive release, to quick connect/disconnect connectors and to leash and collar combinations with disconnect control at the handle end of the leash.

| | |
|---|---|
| 2,556,117 | 3,422,502 |
| 3,099,250 | 3,540,089 |
| 3,332,117 | 4,678,360 |
| 3,413,692 | 4,733,628 |

Examination of these patents shows that the leash of U.S. Pat. No. 3,540,089 is not adaptable to having the leash disconnect operable from the handle of the leash and, also, the connectors are not considered to be adaptable to operation from a handle of a leash incorporating the connector. Further, the connectors require quite close attention and detailed handling to make the connection. Also, known disconnectable leash/collar combinations with disconnect controls at the handle, patented and not, are considered to require considerable precision and care for reconnection. For example the leash of U.S. Pat. No. 3,099,250, Soles, Jr. requires careful insertion of a plug or stud into the end of a tube.

Accordingly, the primary objective of the subject invention is to provide a leash/collar combination which allows quick connection and disconnection between the leash and collar, has control for disconnection in the handle of the leash and does not require close attention and detailed handling to connect the collar to the leash.

SUMMARY OF THE INVENTION

The subject invention is a leash and collar having a quick disconnect/connect connector between the collar and leash. The control for disconnecting is in the handle of the leash and connection of the leash to the collar requires minimal attention to and detail handling of parts. The collar is fitted with a short length of stiff, flexible cable which extends radially from the collar. A short, small diameter cylinder (or a sphere) is swaged to the end of the collar cable. This cylinder (or sphere) is termed the held element for purposes of this disclosure. The load carrying component of the leash is a cable. A short, small diameter cylinder (or a sphere), is swaged to one end of the leash cable and is termed a holding element for purposes of this disclosure. The other end of the leash cable is fastened in the handle assembly of the leash. A flexible, tubular sheath slides on the cable. A holding fitting is attached to the sheath near the end of the sheath closest to the holding element. The other end of the sheath is attached to a fitting which slides in the handle assembly and is spring loaded to pull the sheath into the handle a predetermined distance. To cock or arm the leash for disconnection the sheath is pulled out of the handle as far as the mechanism permits and is latched in that position by a spring loaded button which is accessible in a recessed hole in the handle. When the leash is cocked the holding fitting is positioned so that its longitudinally slotted cylindrical portion is surrounding the holding element. To connect the leash to the collar, the held element on the collar is inserted into the holding fitting so that the held element is between the holding element and the end of the sheath. The collar cable fits through the slot in the holding fitting. The holding fitting is flared in a funnel-like shape to make it easy to capture the held element in the fitting. The held element cannot pass the holding element in the slotted cylindrical part of the holding fitting and the leash is connected to the collar. The held element is latched into the holding fitting by the end of the sheath to prevent accidental disconnection.

To disconnect, the button in the handle is pushed to unlatch the handle mechanism and allow the spring to move the sheath and holding fitting along the cable toward the handle assembly. This motion moves the holding fitting so that it no longer surrounds the held and holding elements and there is disconnection. The handle is then cocked or reset, ready for reconnection when desired.

The invention is described in more detail below with reference to the attached drawings.

BRIEF DESCRIPTION OF THE DRAWINGS

FIG. 1 is a general view of the subject leash and collar.

FIG. 2 illustrates the cable and held element on the collar.

FIG. 3 is a schematic sectional view of the leash and collar, connected.

FIG. 4 is similar to FIG. 3 but with the leash and collar disconnected.

FIG. 5 illustrates details of the shape of the holding fitting and its attachment to the sheath.

FIG. 6 illustrates a one-piece embodiment of mechanism in the handle assembly of the leash.

FIG. 7 illustrates schematically another embodiment of the invention.

FIG. 7A illustrates the cross sectional view of line 7A—7A in FIG. 7.

FIG. 8 illustrates the cross sectional view of line 8—8 as viewed in FIG. 7.

DETAILED DESCRIPTION OF THE INVENTION

The subject invention is a leash and collar having a quick disconnect/connect connector between the collar and leash, generally illustrated in FIG. 1. Collar cable 10 is attached at one of its ends 11 to collar 12 and extends generally radially from the collar. Connector end 13 of this collar cable (not visible in this view) is engaged (as explained below) in holding fitting 14 on leash 15. Disconnection of the collar from the leash is effected by pushing latch button 16 in handle assembly 17 of the leash. FIG. 2 illustrates the cable 10 on collar 12 and held element 18 attached to connector end 13 of the cable. The held element shown is a short, small diameter cylinder; however a spherical element is also acceptable.

FIG. 3 is a schematic section of the leash and collar, connected. The load carrying component of the leash is cable 19 which extends the full length of the leash, connector end 20 of this cable being attached in holding element 21 and end 22 being fastened in part 23 in end 24 of sleeve 25 of the handle assembly 26. Ends 27 and 28 of handle loop 29 are attached to part 24 by swaged ring 30. The swaging also anchors the cable in part 24.

Holding element 21 is engaged with held element 18 inside cylindrical portion 31 of holding fitting 14. Clamp portion 32 of the holding fitting is clamped around sheath 33 with connector end 34 of the sheath at the juncture of cylindrical portions 31 and flared portion 35 of the holding fitting. Details of the shape of the holding fitting are shown in FIG. 5 and described below. The sheath and cable are known commercially as Bowden Wire. The sheath extends from the holding fitting into slider 36 with its handle end 37 anchored in the slider by swaged ring 38. The slider slides in sleeve 25 and spring 39 urges it away from flange 40 at end 41 of sleeve 25. In this view the slider is latched to the sleeve by latch button 16 in holes 42 in the slider and 43 in the sleeve. Spring wire clip 44 urges the latch button into the latching position with flange 45 on the button limiting its travel through the holes. End 46 of the spring clip engages hole 47 in the button to retain the clip in place. Sleeve 25 is enclosed in an elastomeric covering 48, to improve its appearance and its handling comfort and reliability. Hole 49 in the covering provides access to button 16. End 50 of the button is recessed in hole 49 to prevent disconnection of the leash from the collar by accidental depression of the button. The slider latch button, clip 44 and spring 39 constitute a spring loaded mechanism in the handle.

FIG. 4 is similar to FIG. 3 but the collar and leash are disconnected. Button 16 has been depressed, unlatching slider 36 and allowing spring 39 to move the slider, the sheath and the holding fitting along the cable far enough so that the held and holding elements are no longer confined in the holding fitting, effecting disconnection of the collar from the leash. To reconnect them the leash is reset by pulling the sheath out of the sleeve (handle) against the force of the spring until the button can relatch the slider to the sleeve, thereby moving the holding fitting so that the cylindrical portion again surrounds the holding element. The holding fitting and the held element on the end of the collar cable are then maneuvered to put the held element in the holding fitting between the holding element and the end of the sheath.

The levels of skill, manual dexterity and concentration required for reconnection are significantly minimized by the configuration of the holding fitting as shown in FIG. 5. Flared portion 35 facilitates guiding the held element into the fitting and the collar cable 10 into and through slot 51 in the holding fitting.

FIG. 6 illustrates a one-piece embodiment of the slider, button and spring clip. Part 52 is molded plastic and is attached to sheath 53 by swaged ring 54. Button 55 is formed at the end of arm 56 which is formed by slot 57.

FIG. 7 is a sectioned schematic of an alternate embodiment of the handle assembly of the subject invention. The tension load carrying cable 58 is anchored in handle 59 by set screw 60 in threaded hole 61. Sheath 62 is attached to slider 63 by swage ring 64. Slider 63 slides in hole 65 and is engaged by extension 66 on trigger 67 in groove 68. The trigger is supported by shaft 69 and moves in slot 70. Pin 71 limits the travel of the trigger, slider and sheath under the force applied by spring 72.

In use the connector is disconnected by pulling the trigger, moving holding fitting 73 from around holding element 74 and held element 75. Releasing the trigger resets the mechanism for reconnection by maneuvering element 75 into flared portion 76 of fitting 73 with cable 77 passing through slot 78.

FIG. 7A is a section taken at 7A—7A in FIG. 7 and illustrates a safety catch which disables disconnection when desired. Catch 79 is shown in FIG. 7A in its enable setting, with hole 80 aligned with hole 81 in which trigger shaft 69 operates. Shifting the catch to the position shown in phantom lines blocks motion of the trigger and disables disconnection. Slit 82 in the catch allows tab 83 to be deformed to inhibit the motion of the catch by friction. With the catch in its enable position disconnection can be caused by pulling the trigger or by applying force to the sheath or holding fitting in the direction toward the handle assembly.

In another embodiment of the handle assembly the catch 79 is spring loaded into the disable position and disconnection requires first moving the catch to the able position and then pulling the trigger.

It is considered to be understandable from this description that the subject invention meets its objectives. It provides a leash/collar combination which allows quick connection and disconnection of the two. The control for disconnection is in the handle of the leash and reconnection does not require close attention and detailed handling.

It is also considered to be understood that while certain embodiments of the subject invention are described herein, other embodiments and modifications of those described are possible within the scope of the invention which is limited only by the attached claims.

I claim:

1. A leash and collar having a quick connect/disconnect connector, said leash comprising a first cable having a first connector end and a holding element attached at said first connector end, said collar being fitted with a second cable having a second connector end and a held element attached at said second connector end, said connector comprising said held element, said holding element, and a fitting configured to hold said held element and said holding element in engagement, said leash further comprising apparatus for moving said fitting along said cables such that said elements are not confined in said fitting and said leash is disconnected from said collar.

2. The leash and collar of claim 1 in which said leash has a handle assembly and a latch in said handle assembly, and in which said apparatus for moving comprises a sheath over said first cable and a spring loaded mechanism latched by said latch, said first cable having a handle assembly end attached to said handle assembly, said sheath having a first sheath end attached to said fitting and a second sheath end attached to said spring loaded and latched mechanism such that when said latch is released said spring loaded and latched mechanism is unlatched and moves said sheath along said first cable, thereby moving said fitting such that said elements are not confined in said fitting and said leash is disconnected from said collar.

3. The leash and collar of claim 1 in which said leash has a handle assembly and a trigger in said handle assembly and in which said apparatus for moving comprises said trigger and a sheath over said first cable, said first cable having a handle end attached to said handle assembly, said sheath having a first sheath end attached to said fitting and a second sheath end attached to said trigger such that pulling said trigger moves said sheath along said first cable, thereby moving said fitting such that said elements are not confined in said fitting and said leash and collar are disconnected.

\* \* \* \* \*